(12) United States Patent
Huber

(10) Patent No.: US 11,600,888 B2
(45) Date of Patent: Mar. 7, 2023

(54) VEHICLE WITH A HIGH-VOLTAGE ACCUMULATOR

(71) Applicant: Bayerische Motoren Werke Aktiengesellschaft, Munich (DE)

(72) Inventor: Bastian Huber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/053,595

(22) PCT Filed: Jun. 3, 2019

(86) PCT No.: PCT/EP2019/064253
§ 371 (c)(1),
(2) Date: Nov. 6, 2020

(87) PCT Pub. No.: WO2019/243022
PCT Pub. Date: Dec. 26, 2019

(65) Prior Publication Data
US 2021/0226296 A1    Jul. 22, 2021

(30) Foreign Application Priority Data

Jun. 19, 2018  (DE) ..................... 10 2018 209 925.1

(51) Int. Cl.
*H01M 50/30*    (2021.01)
*H01M 10/615*   (2014.01)
(Continued)

(52) U.S. Cl.
CPC ........ *H01M 50/394* (2021.01); *G07C 5/0825* (2013.01); *G07C 5/0833* (2013.01);
(Continued)

(58) Field of Classification Search
CPC .............. G07C 5/0833; H01M 10/486; H01M 2220/20; H01M 10/48; B60K 6/28; B60Y 2200/91; B60Y 2200/92; G01R 31/3646
See application file for complete search history.

(56) References Cited

U.S. PATENT DOCUMENTS

2006/0036883 A1    2/2006  Hashizumi et al.
2006/0172188 A1    8/2006  Okuda et al.
(Continued)

FOREIGN PATENT DOCUMENTS

CN    203391606 U    1/2014
CN    203800103 U    8/2014
(Continued)

OTHER PUBLICATIONS

International Search Report (PCT/ISA/210) issued in PCT Application No. PCT/EP2019/064253 dated Sep. 5, 2019 with English translation (four (4) pages).
(Continued)

*Primary Examiner* — Maria Laios
*Assistant Examiner* — Bartholomew A Hornsby
(74) *Attorney, Agent, or Firm* — Crowell & Moring LLP

(57) ABSTRACT

A high-voltage accumulator has a high-voltage accumulator housing in which multiple electric storage cells are arranged. A wall of the high-voltage accumulator housing is equipped with at least one aeration/ventilation device which is gas-permeable at least from the interior of the high-voltage accumulator housing to the exterior of the high-voltage accumulator housing such that gas can leak out of the interior of the high-voltage accumulator in the event of an overpressure in the interior of the high-voltage accumulator housing. The aeration/ventilation device is equipped with a
(Continued)

device, by which a substance that accumulates on the aeration/ventilation device and partly or completely blocks same can be removed.

8 Claims, 1 Drawing Sheet

(51) Int. Cl.
*H01M 10/48* (2006.01)
*B60K 6/28* (2007.10)
*G07C 5/08* (2006.01)

(52) U.S. Cl.
CPC ....... *H01M 10/486* (2013.01); *H01M 10/615* (2015.04); *B60K 6/28* (2013.01); *B60Y 2200/91* (2013.01); *B60Y 2200/92* (2013.01); *H01M 2220/20* (2013.01)

(56) References Cited

U.S. PATENT DOCUMENTS

| | | | | |
|---|---|---|---|---|
| 2009/0071178 | A1* | 3/2009 | Major | B60L 58/27 62/239 |
| 2009/0197154 | A1 | 8/2009 | Takasaki et al. | |
| 2010/0297514 | A1 | 11/2010 | Jufuku et al. | |
| 2012/0247338 | A1 | 10/2012 | Bauer et al. | |
| 2013/0157091 | A1 | 6/2013 | Gadawski | |
| 2013/0209844 | A1 | 8/2013 | Gless et al. | |
| 2013/0298419 | A1* | 11/2013 | Trevett | G02B 27/0006 34/279 |
| 2013/0302653 | A1* | 11/2013 | Pham | B60L 1/003 429/50 |
| 2014/0079964 | A1 | 3/2014 | Gless et al. | |
| 2015/0072184 | A1 | 3/2015 | Kusunoki et al. | |
| 2015/0198674 | A1* | 7/2015 | Kroker | G01R 31/367 324/430 |
| 2015/0333380 | A1* | 11/2015 | Minamiura | B60L 3/0046 73/198 |
| 2016/0141572 | A1 | 5/2016 | Nakayama | |
| 2016/0254578 | A1 | 9/2016 | Liu et al. | |
| 2018/0241017 | A1 | 8/2018 | Nakamura et al. | |

FOREIGN PATENT DOCUMENTS

| | | | | |
|---|---|---|---|---|
| CN | 104466050 | A | 3/2015 | |
| CN | 205790261 | U | 12/2016 | |
| DE | 10 2011 005 916 | A1 | 9/2012 | |
| DE | 10 2011 015 981 | A1 | 5/2013 | |
| DE | 20 2012 012 670 | U1 | 9/2013 | |
| DE | 10 2013 207 398 | A1 | 10/2014 | |
| DE | 10 2013 215 699 | A1 | 2/2015 | |
| DE | 102013215699 | A1 * | 2/2015 | .......... H01M 10/425 |
| DE | 10 2013 021 414 | A1 | 6/2015 | |
| EP | 2 533 346 | A1 | 12/2012 | |
| EP | 2533346 | A1 * | 12/2012 | .............. B60L 1/003 |
| EP | 2 586 080 | B1 | 7/2017 | |
| EP | 2 856 555 | B1 | 5/2018 | |
| EP | 3 333 934 | A1 | 6/2018 | |
| EP | 3333934 | A1 * | 6/2018 | .......... H01M 10/613 |
| GB | 1 534 037 | A | 11/1978 | |
| JP | 2017-91950 | A | 5/2017 | |
| JP | 2018-73560 | A | 5/2018 | |
| KR | 10-2013-0069393 | A | 6/2013 | |
| WO | WO 2012/076808 | A1 | 6/2012 | |
| WO | WO 2014/053623 | A2 | 4/2014 | |
| WO | WO 2014/060166 | A1 | 4/2014 | |
| WO | WO 2017/073201 | A1 | 5/2018 | |

OTHER PUBLICATIONS

German-language Written Opinion (PCT/ISA/237) issued in PCT Application No. PCT/EP2019/064253 dated Sep. 5, 2019 (six (6) pages).

German-language Office Action issued in German Application No. 10 2018 209 925.1 dated Apr. 12, 2019 (five (5) pages).

German-language Office Action issued in German Application No. 10 2018 209 925.1 dated May 2, 2022 (four (4) pages).

Korean-language Office Action issued in Korean Application No. 10-2020-7028115 dated Apr. 6, 2022 with English translation (six (6) pages).

Chinese-language Office Action issued in Chinese Application No. 201980027515.1 dated May 6, 2022 with English translation (26 pages).

\* cited by examiner

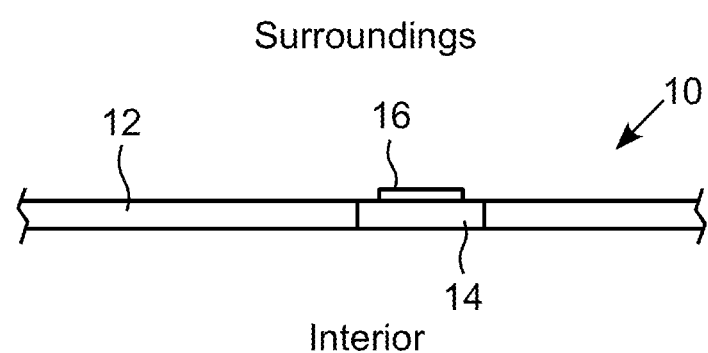

VEHICLE WITH A HIGH-VOLTAGE ACCUMULATOR

BACKGROUND AND SUMMARY OF THE INVENTION

The present invention relates to a vehicle with a high-voltage accumulator.

Electric vehicles or hybrid vehicles are equipped with a high-voltage accumulator which stores electrical energy to drive an electric machine which generates propulsion of a vehicle. Such a high-voltage accumulator has a high-voltage accumulator housing in which a plurality of storage cells which are connected electrically to one another are arranged. In order to make possible pressure equalization between the interior of the high-voltage accumulator housing and the surroundings in the event of fluctuations of the ambient air pressure and/or a cell short-circuit and associated destruction of one or more storage cells and resulting outgassing of storage cells, high-voltage accumulator housings usually have at least one aeration/ventilation device. An exchange of gas between the interior of the high-voltage accumulator housing and the surroundings, as well as the escaping of condensate out of the interior of the high-voltage accumulator housing into the surroundings, are possible via the aeration/ventilation device. However, on the other hand, the aeration/ventilation opening prevents the ingress of water or moisture into the interior of the high-voltage accumulator housing.

For satisfactory functioning of the aeration/ventilation device it is necessary to ensure that it always has sufficient gas permeability.

The object of the invention is to provide a high-voltage accumulator, or a vehicle with such a high-voltage accumulator, whose aeration/ventilation device has increased functional reliability.

The starting point of the invention is a vehicle with a high-voltage accumulator which has a high-voltage accumulator housing in which a plurality of electric storage cells are arranged. At least one aeration/ventilation device is provided in a wall of the high-voltage accumulator housing. The term "wall" is to be understood in an extremely broad fashion. In this context, it can be an upper or lower wall or a side wall of the high-voltage accumulator housing for example. The aeration/ventilation device is gas-permeable (at least semi-permeable) at least from an interior of the high-voltage accumulator housing to an outer side or to the surroundings of the high-voltage accumulator housing, and therefore permits gas to escape from the interior of the high-voltage accumulator housing to the outside or into the surroundings, and pressure equalization to take place, in the event of an overpressure in the interior of the high-voltage accumulator housing.

The core of the invention consists in the fact that a device, by means of which a substance which accumulates on the aeration/ventilation device and partially or entirely blocks said device can be removed, is provided on the aeration/ventilation device. By removing the respective substance by way of the device it is possible to ensure sufficient gas permeability of the aeration/ventilation device.

Depending on the vehicle concept, it may in fact be necessary to arrange the aeration/ventilation device in a region of the vehicle in which snow or ice and/or ambient dirt can collect at cold ambient temperatures. In some vehicle concepts, the aeration/ventilation device must be arranged, for example, in the vicinity of a wheelhouse or in the underfloor region of the vehicle where snow or ice and/or ambient dirt can accumulate under ambient conditions in the winter.

BRIEF DESCRIPTION OF THE DRAWING

The FIGURE is a highly schematic diagram of a high-voltage accumulator housing according to an embodiment of the invention.

DETAILED DESCRIPTION OF THE DRAWING

The FIGURE schematically partly illustrates a high-voltage accumulator housing 10 having a wall 12. An aeration/ventilation device 14 is provided in the wall 12 of the housing 10. A device 16, by which a substance which accumulates on the aeration/ventilation device 14 and partially or entirely blocks the device 14 can be removed, is provided on the aeration/ventilation device 14.

According to one development of the invention, the device 16 by which a blocking substance can be removed has a heating device. For example, it is possible to provide an electric heating device (e.g. a resistance heater) by which the aeration/ventilation device can be heated. By heating the aeration/ventilation device it is possible to melt away snow or ice which has accumulated on the aeration/ventilation device, as a result of which partial or complete blockage of the aeration/ventilation device can be prevented or eliminated.

As an alternative or addition to an electric heating device, the device by which the blocking substance can be removed can also have a heating duct through which a heating medium flows. The heating duct can be connected, for example, to a heating/cooling duct system of the high-voltage accumulator and/or have a flow connection thereto. The storage cells arranged in the interior of the high-voltage accumulator housing can be heated or cooled according to requirements by means of the heating/cooling duct system of the high-voltage accumulator.

As an alternative or addition to an electric heating device or a heating duct, the device by which the blocking substance can be removed can also have an ultrasonic sound generator with which blocking substance, such as e.g. ice or ambient dirt, can be removed from the aeration/ventilation device.

As an alternative or addition to an electric heating device or a heating duct or an ultrasonic sound generator, a spray nozzle could also be provided, by which spray nozzle cleaning fluid can be sprayed on or toward the aeration/ventilation device, and said device can therefore be cleaned.

According to one development of the invention there is provision that the abovementioned heating device can be switched on or off, and that the heating device is switched on only if a temperature measured at a specified location on the vehicle is lower than a specified temperature. For example, the temperature of the ambient air can be measured by a sensor which is arranged in the engine cavity or at another location on the vehicle. If the temperature of the ambient air is less than a specified temperature of e.g. +3° C. or +2° C. or +1° C. or 0° C., the heating device is switched on or is in a switched-on state.

According to one development of the invention, a sensor is provided with which it is possible to detect whether the aeration/ventilation device is partially or entirely blocked by a blocking substance. Such a sensor can be based on one or more sensor principles. For example, a sensor can be provided which is based on an electrical resistance measurement, wherein a sensor element of the sensor has an electrical resistance which depends on the degree of blockage of the aeration/ventilation device, i.e. on the loading of the aeration/ventilation device with a blocking substance.

As an alternative or in addition to this, a sensor can be used which is based on an optical permeability measurement, wherein the optical permeability of the aeration/ventilation device depends on the degree of blockage of the aeration/ventilation device with a blocking substance, i.e. on the loading of the aeration/ventilation device with a blocking substance.

As an alternative or in addition to this, the sensor can be based on the principle of a change in inductance. An inductance which is to be monitored depends here on the degree of blockage of the aeration/ventilation device with a blocking substance, i.e. on the loading of the aeration/ventilation device with a blocking substance.

As already mentioned above, the invention relates not only to a high-voltage accumulator but also to a vehicle with such a high-voltage accumulator.

According to one development of the invention, monitoring electronics are provided which output a visual and/or acoustic warning message when a specified degree of blockage of the aeration/ventilation device in a passenger compartment of the vehicle is exceeded. For example, a warning message can be visually displayed in the combination instrument, in a display provided in the region of the dashboard, or at some other location, if the aeration/ventilation device exceeds a specified degree of blockage.

What is claimed is:

1. A vehicle comprising:
   a high-voltage accumulator, comprising:
      a high-voltage accumulator housing in which a plurality of electric storage cells are arrangeable;
      at least one aeration/ventilation device provided in a wall of the high-voltage accumulator housing, the at least one aeration/ventilation device being gas-permeable at least from an interior of the high-voltage accumulator housing to an outer side of the high-voltage accumulator housing so that in an event of an overpressure in the interior of the high-voltage accumulator housing gas escapes from the interior of the high-voltage accumulator housing; and
      means, provided for the aeration/ventilation device, for removing a substance which accumulates on the aeration/ventilation device and partially or entirely blocks said aeration/ventilation device;
      a sensor that detects whether the aeration/ventilation device is partially or entirely blocked by the substance; and
      monitoring electronics which output a visual and/or acoustic warning message in a passenger compartment of the vehicle when a specified degree of blockage of the aeration/ventilation device by the substance is exceeded,
   wherein the sensor is at least one of:
      (i) a sensor based on an electrical resistance measurement, wherein the resistance to be measured depends on a degree of blockage of the aeration/ventilation device,
      (ii) a sensor based on an optical permeability measurement, wherein the optical permeability of the aeration/ventilation device depends on the degree of blockage of the aeration/ventilation device, or
      (iii) a sensor based on an inductance measurement, wherein an inductance which is to be monitored depends on the degree of blockage of the aeration/ventilation device.

2. The vehicle according to claim 1, wherein the substance is water which has frozen to form ice or snow, and/or ambient dirt.

3. The vehicle according to claim 1, wherein the means for removing comprises a heater.

4. The vehicle according to claim 3, wherein the heater is an electric heater by which the aeration/ventilation device is heatable, whereby snow or ice which has accumulated is melted away.

5. The vehicle according to claim 3, wherein the heater has at least one heating duct through which a heating medium flows.

6. The vehicle according to claim 5, wherein the heating duct has a flow connection to a heating/cooling duct system of the high-voltage accumulator.

7. The vehicle according to claim 1, wherein the means for removing comprises an ultrasonic sound generator with which a blocking substance which has accumulated on the aeration/ventilation device is removed.

8. The vehicle according to claim 3, wherein the heater is switchable on or off, and is switched on only if a temperature measured at a specified location is lower than a specified temperature.

* * * * *